(12) United States Patent
Kern

(10) Patent No.: US 8,191,875 B2
(45) Date of Patent: Jun. 5, 2012

(54) HYDRAULIC ENGINE MOUNT

(75) Inventor: John L. Kern, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 12/603,614

(22) Filed: Oct. 22, 2009

(65) Prior Publication Data

US 2011/0095459 A1 Apr. 28, 2011

(51) Int. Cl.
*F16F 9/00* (2006.01)
(52) U.S. Cl. .................. 267/140.12; 267/219
(58) Field of Classification Search ............ 267/140.12, 267/140.13, 141.2, 219; 248/562, 638; 29/446, 29/897.2
See application file for complete search history.

(56) References Cited

U.S. PATENT DOCUMENTS

| | | | |
|---|---|---|---|
| 3,642,268 A | 2/1972 | Hipsher | |
| 4,535,976 A | 8/1985 | Dan et al. | |
| 4,681,306 A | 7/1987 | Hofmann et al. | |
| 4,834,349 A | 5/1989 | Arai et al. | |
| 4,871,152 A * | 10/1989 | Funahashi | 267/140.12 |
| 4,881,712 A | 11/1989 | Lun | |
| 4,974,819 A | 12/1990 | Reichard et al. | |
| 5,035,397 A * | 7/1991 | Yamada | 248/638 |
| 5,273,261 A | 12/1993 | Hamberg et al. | |
| 5,906,360 A * | 5/1999 | Kanda | 267/140.12 |
| 6,341,766 B1 | 1/2002 | Stiller et al. | |
| 7,048,264 B2 | 5/2006 | Anzawa et al. | |
| 7,117,969 B2 | 10/2006 | Miyamoto et al. | |
| 7,192,013 B2 * | 3/2007 | Miyahara | 267/140.12 |
| 7,458,565 B2 | 12/2008 | Miyahara | |
| 2003/0201590 A1 * | 10/2003 | Thornhill | 267/140.12 |

* cited by examiner

*Primary Examiner* — Christopher Schwartz
(74) *Attorney, Agent, or Firm* — Gregory J. Burke, Esq.; Emerson Thomson Bennett

(57) ABSTRACT

A hydraulic engine mount assembly includes a support bracket defining a passageway that communicates between a pair of fluid chambers formed in an elastomeric body. According to one embodiment, the mount includes first and second connection devices for respectively connecting the engine mount to first and second connection surfaces.

20 Claims, 5 Drawing Sheets

HYDRAULIC ENGINE MOUNT

I. BACKGROUND OF THE INVENTION

A. Field of Invention

This invention generally relates to vehicular engine mounts and more specifically relates to fluid filled engine mounts, commonly referred to as hydraulic engine mounts.

B. Description of the Related Art

It is well known to provide vehicles with an engine or motor that is used to propel the vehicle. Typically, the engine is supported to the vehicle's chassis or frame with one or more engine mounts that isolate the vibrations that occur during the operation of the engine and the vehicle. There are many different types of engine mounts though most include an elastomeric material, such as rubber, housed in a support structure. One type of engine mount, sometimes referred to as a hydraulic engine mount or hydromount, has a pair of fluid chambers filled with a fluid, such as glycol, that travels between the chambers when the engine mount is under load to provide vibration damping characteristics.

FIGS. 4-5 show an example of a known hydraulic engine mount assembly 1. The hydraulic engine mount assembly 1 includes an elastomeric body 2 housed in a cylindrically shaped support bracket 3. The elastomeric body 2 has a pair of fluid chambers 4, 5 that contain a hydraulic fluid. An orifice plate 6 contains a passageway through which the fluid can flow between the fluid chambers 4, 5. A collar 7 is positioned within the elastomeric body 2 and the support bracket 3 and has an opening 11 that receives a shaft/bolt 8. The shaft/bolt 8 attaches the engine mount assembly 1 to a connection bracket 9 that connects, with bolts 12, the engine mount assembly 1 to the engine (not shown). Two connection brackets 10, are fixed to outer surfaces of the support bracket 3 and are used to connect, with bolts 13, the engine mount assembly 1 to the vehicle chassis or frame (not shown).

While known hydraulic engine mount assemblies generally work well for their intended purposes, they have limitations. One limitation is related to the orifice plate. The orifice plate is a separate piece requiring additional weight, additional material costs, and additional manufacturing costs in assembling this separate piece into the hydraulic engine mount.

What is needed is a method and apparatus for removing the need for an orifice plate. In this way, the limitations known in the art are overcome.

II. SUMMARY OF THE INVENTION

According to one embodiment of this invention, a hydraulic engine mount assembly includes: a support bracket including: first, second, and third surfaces; and, a first passageway communicating the first surface to the second surface; an elastomeric body attached to the support bracket that defines with the first surface of the support bracket a first fluid chamber and that defines with the second surface of the support bracket a second fluid chamber; a fluid that is movable within the first passageway between the first and second fluid chambers to provide the hydraulic engine mount assembly with vibration damping characteristics; a first connection device for connecting the hydraulic engine mount assembly to a first connection surface; and, a second connection device for connecting the hydraulic engine mount assembly to a second connection surface. One of the first connection device and the second connection device may be attached to the third surface of the support bracket.

According to another embodiment of this invention, a method includes the steps of: (A) forming a support bracket out of resin to have a first passageway communicating a first surface of the support bracket to a second surface of the support bracket; (B) attaching an elastomeric body to the support bracket to define with the first surface of the support bracket a first fluid chamber and to define with the second surface of the support bracket a second fluid chamber; and, (C) adding a fluid into at least one of the first fluid chamber, the second fluid chamber and, the first passageway to provide a hydraulic engine mount assembly with vibration damping characteristics.

According to another embodiment of this invention, a hydraulic engine mount assembly includes: a support bracket that: (1) is substantially cylindrically shaped with an inner face having first and second surfaces and an outer face; (2) is formed substantially of resin; and, (3) has a first passageway communicating the first surface of the inner face to the second surface of the inner face; a collar member that: (1) is substantially cylindrically shaped with an inner face and an outer face; and, (2) is positioned at least partially within the support bracket; an elastomeric body that: (1) is attached to the inner face of the support bracket with an adhesive; (2) defines with the first surface of the inner face of the support bracket a first fluid chamber; (3) defines with the second surface of the inner face of the support bracket a second fluid chamber; and, (4) is positioned at least partially between the outer face of the collar member and the inner face of the support bracket; a fluid that: (1) is received within the first and second fluid chambers; and, (2) is movable within the first passageway between the first and second fluid chambers to provide the hydraulic engine mount assembly with vibration damping characteristics; a first connection device that: (1) connects the engine mount assembly to an associated engine; and, (2) is positioned at least partially within the collar member; and, a second connection device that: (1) connects the engine mount assembly to an associated vehicle support structure; and, (2) is attached to the outer face of the support bracket.

An advantage of this invention is that an orifice plate is no longer required for a hydraulic engine mount. As a result, weight, material costs, and manufacturing costs can be reduced.

Other benefits and advantages of this invention will become apparent to those skilled in the art to which it pertains upon reading and understanding of the following detailed specification.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
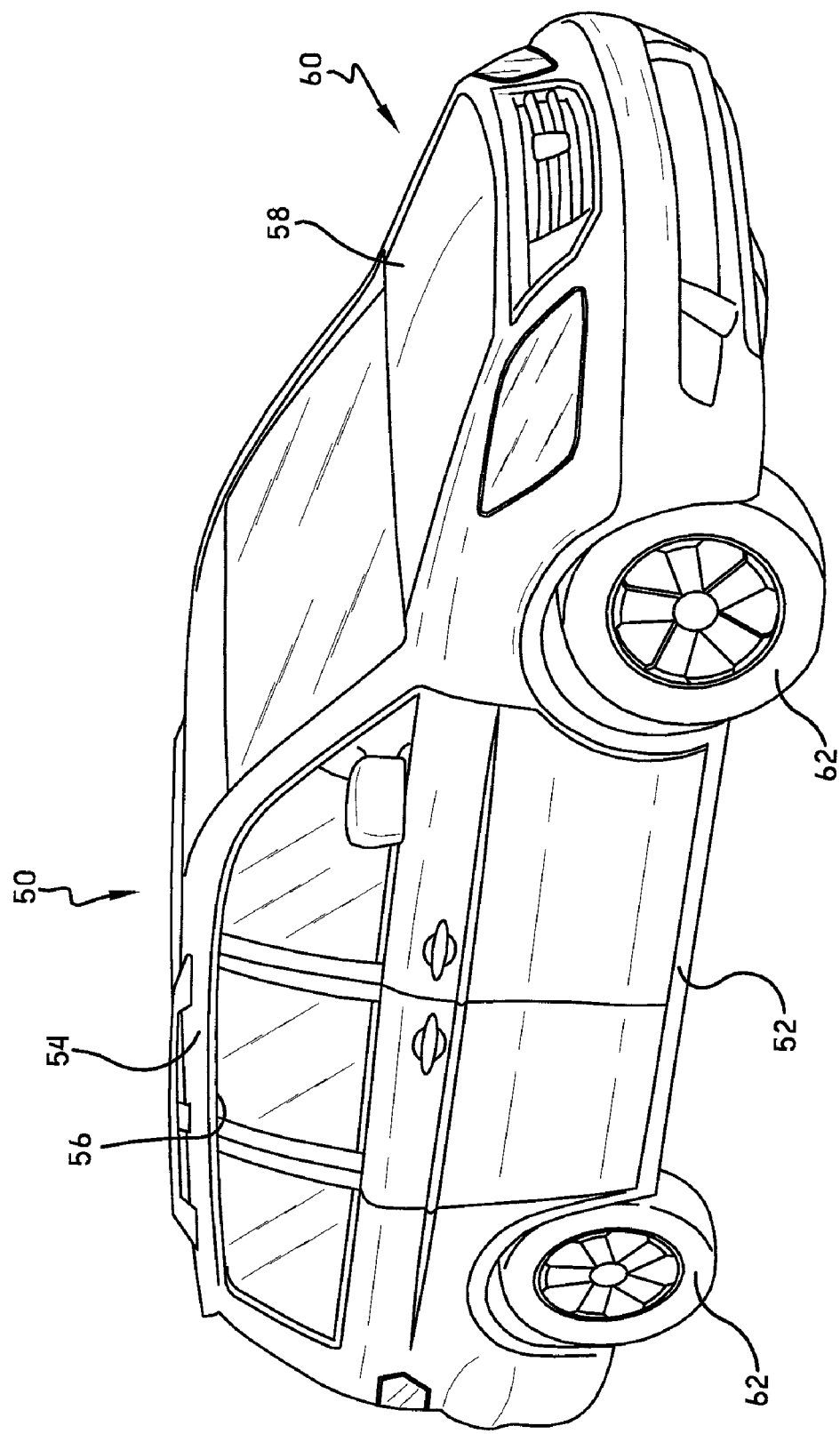
FIG. 1 is a perspective view of a vehicle.

Referring now to the drawings wherein the showings are for purposes of illustrating embodiments of the invention only and not for purposes of limiting the same, and wherein like reference numerals are understood to refer to like components, FIG. 1 shows a vehicle 50 that may use one or more hydraulic engine mount assemblies 100 (shown in FIG. 2) according to this invention. While the vehicle 50 shown is an automobile, it is to be understood that the hydraulic engine mount assembly 100 of this invention will work well with any vehicle including, but not limited to, cars, trucks, sport utility vehicles, cross-over vehicles, off-road vehicles, all-terrain vehicles, and airplanes as well as other passenger carrying devices such as boats. This invention will also work well in non-vehicle applications.

Figure 2:
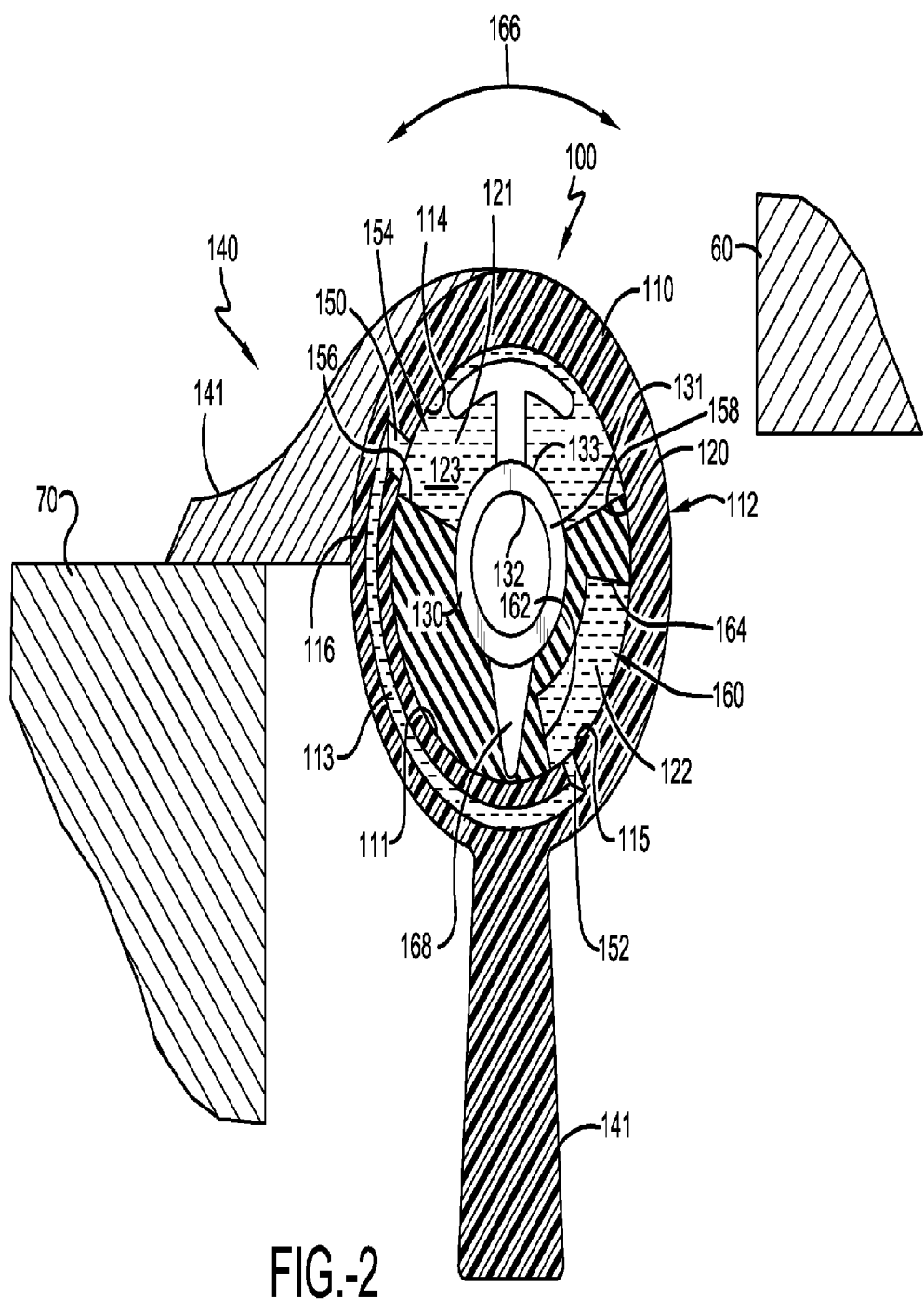
FIG. 2 is a sectional view of a hydraulic engine mount assembly.

With reference now to FIGS. 1-2, the vehicle 50 may include a frame 52 and a body 54 that is supported to the frame 52. The body 54 may define a passenger compartment 56 for housing passengers and a locomotion compartment 58 for housing a locomotion source 60, such as an internal combustion engine (ICE) or an electric motor (shown schematically in FIG. 2). The locomotion source 60 may be mounted to the frame 52 via a chassis or other support structure 70 (shown schematically in FIG. 2) as is known to those of skill in the art. The vehicle 50 may also have one or more ground engaging wheels 62 for uses well known in the art such as steering and transferring power from the locomotion source 60 to provide locomotion for the vehicle 50. As the basic operation of a locomotion source 60 and the manner in which it is supported is well known to those of skill in the art, further details will not be described here except as apply to this invention.

Figure 3:
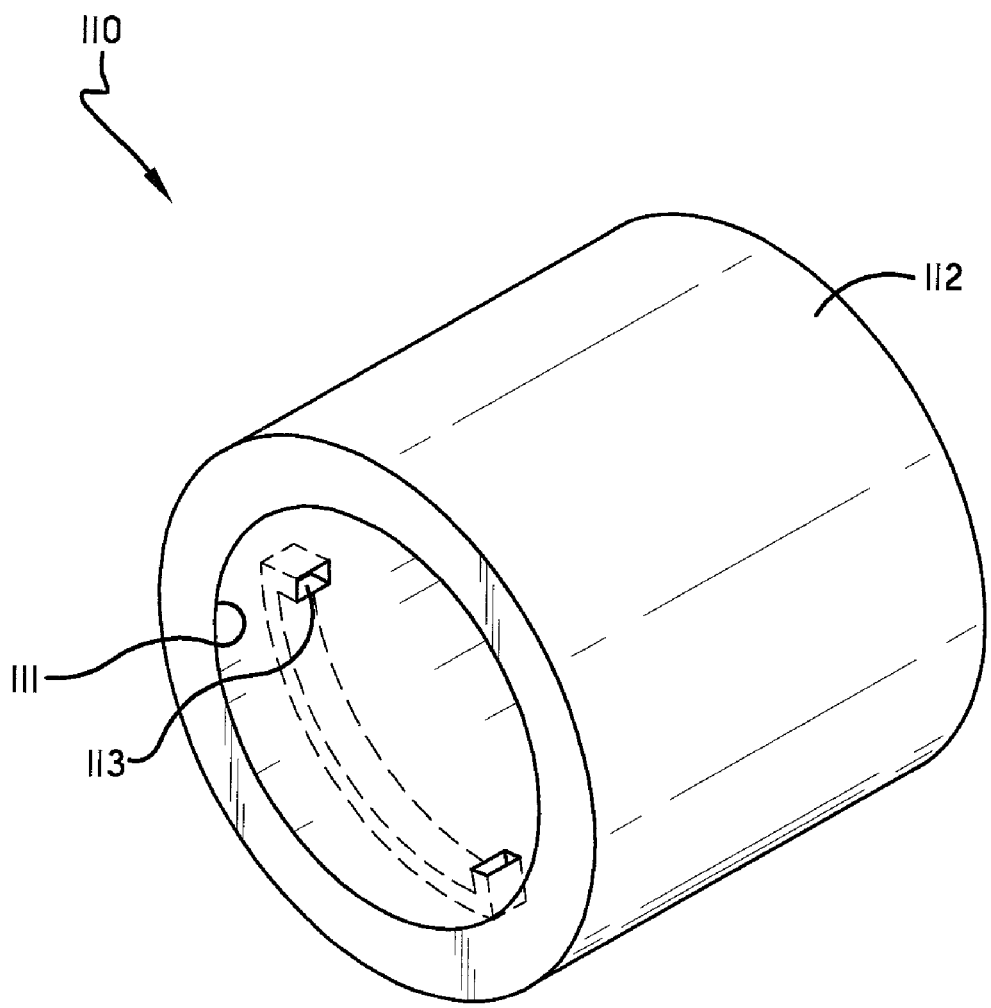
FIG. 3 is a perspective view of a support bracket having a passageway formed therethrough.

With reference now to FIGS. 1-3, the hydraulic engine mount assembly 100, which is used to mount the locomotion source 60 to the support structure 70, may include a support bracket 110 and an elastomeric body 120 which may be positioned substantially inside the support bracket 110 in a known manner. The support bracket 110 may be of any size, shape, and material chosen with the sound judgment of a person of skill in the art. For the embodiment shown, the support bracket 110 is cylindrically shaped having an inner face 111, an outer face 112, and at least one passageway 113. The passageway 113 terminates at one end or a first opening 150 at a first surface 114 of the support bracket 110 and terminates at the other end or a second opening 152 at a second surface 115 of the support bracket 110. In this way, the passageway 113 communicates the first surface 114 to the second surface 115. The placement of the passageway 113 in the support bracket 110 eliminates the need for an orifice plate as is known in the art. The passageway 113 can be formed within the support bracket 110 in any manner chosen with the sound judgment of a person of skill in the art. In one embodiment, the passageway 113 is molded into the support bracket 110. The first and second surfaces 114, 115 may be positioned on the inner face 111 of the support bracket 110, as shown, but this is not required with this invention. In one embodiment the support bracket 110 is formed of a resin.

With reference now to FIG. 2, the elastomeric body 120 may be attached to the support bracket 110 in any manner chosen with the sound judgment of a person of skill in the art such as, in one non-limiting embodiment, with an adhesive. The elastomeric body 120 defines with the first surface 114 of the support bracket 110 a first fluid chamber 121 and defines with the second surface 115 of the support bracket 110 a second fluid chamber 122. A fluid 123 is movable within the passageway 113 between the first and second fluid chambers 121, 122 to provide the hydraulic engine mount assembly 100 with vibration damping characteristics as is well known by those of skill in the art. FIG. 2 shows that the elastomeric body 120 includes a first open portion 154 extending between first and second circumferentially spaced edges 156, 158. The first open portion 154 forms the first fluid chamber 121. FIG. 2 also shows that the elastomeric body 120 includes a second open portion 160 extending between first and second circumferentially spaced edges 162, 164. The second open portion 160 forms the second fluid chamber 122 described below. FIG. 2 also shows that the first edge 156 of the first open portion 154 is positioned between and the first edge 162 of the second open portion 160 and the second edge 158 of the first portion 154 about a circumference 166 of the elastomeric body 120. FIG. 2 also shows that the first and second openings 150, 152 of the first passageway 113 are respectively positioned directly adjacent to the first edge 156 of the first open portion 154 and the first edge 162 of the second open portion 160. FIG. 2 also shows that a gap 168 in the elastomeric body 120 is positioned between the respective first edges 156, 162 of the first and second open portions 154, 160 about the circumference 166 of the elastomeric body 120. FIG. 2 also shows that the respective second edges 158, 164 of the first and second open portions 154, 160 are directly adjacent to one another about the circumference 166 of the elastomeric body 120 and the elastomeric body 120 fills the circumferential distance between the respective second edges 158, 164 of the first and second open portions 154, 160. FIG. 2 also shows that the respective second edges 158, 164 of the first and second open portions 154, 160 are closer to one another than the respective first edges 156, 162 of the first and second open portions 154, 160 about the circumference 166 of the elastomeric body 120. The fluid 123 can be of any type chosen with the sound judgment of a person of skill in the art, such as glycol.

Figure 4:
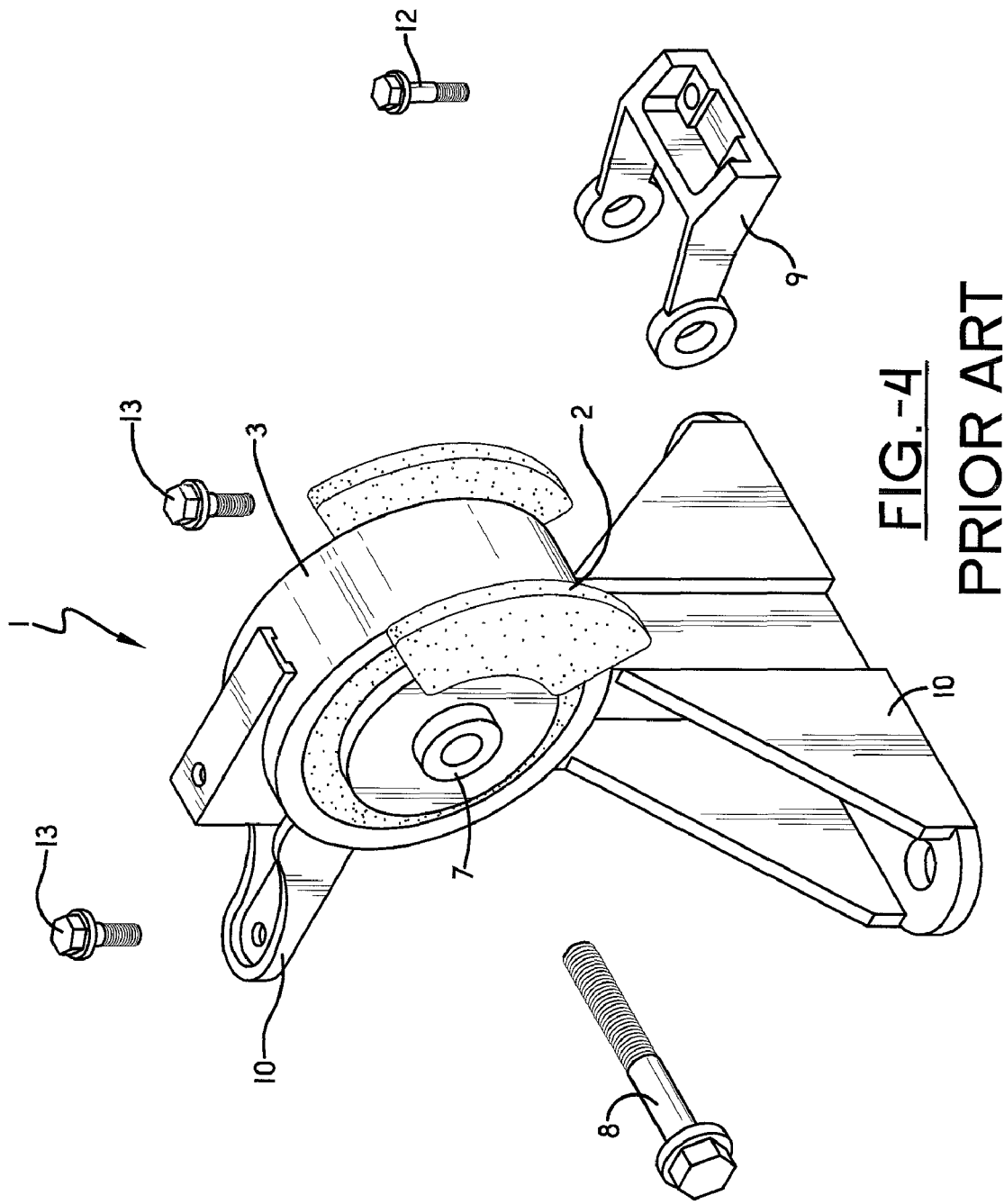
FIG. 4 is an assembly drawing of a prior art hydraulic engine mount assembly.
Figure 5:
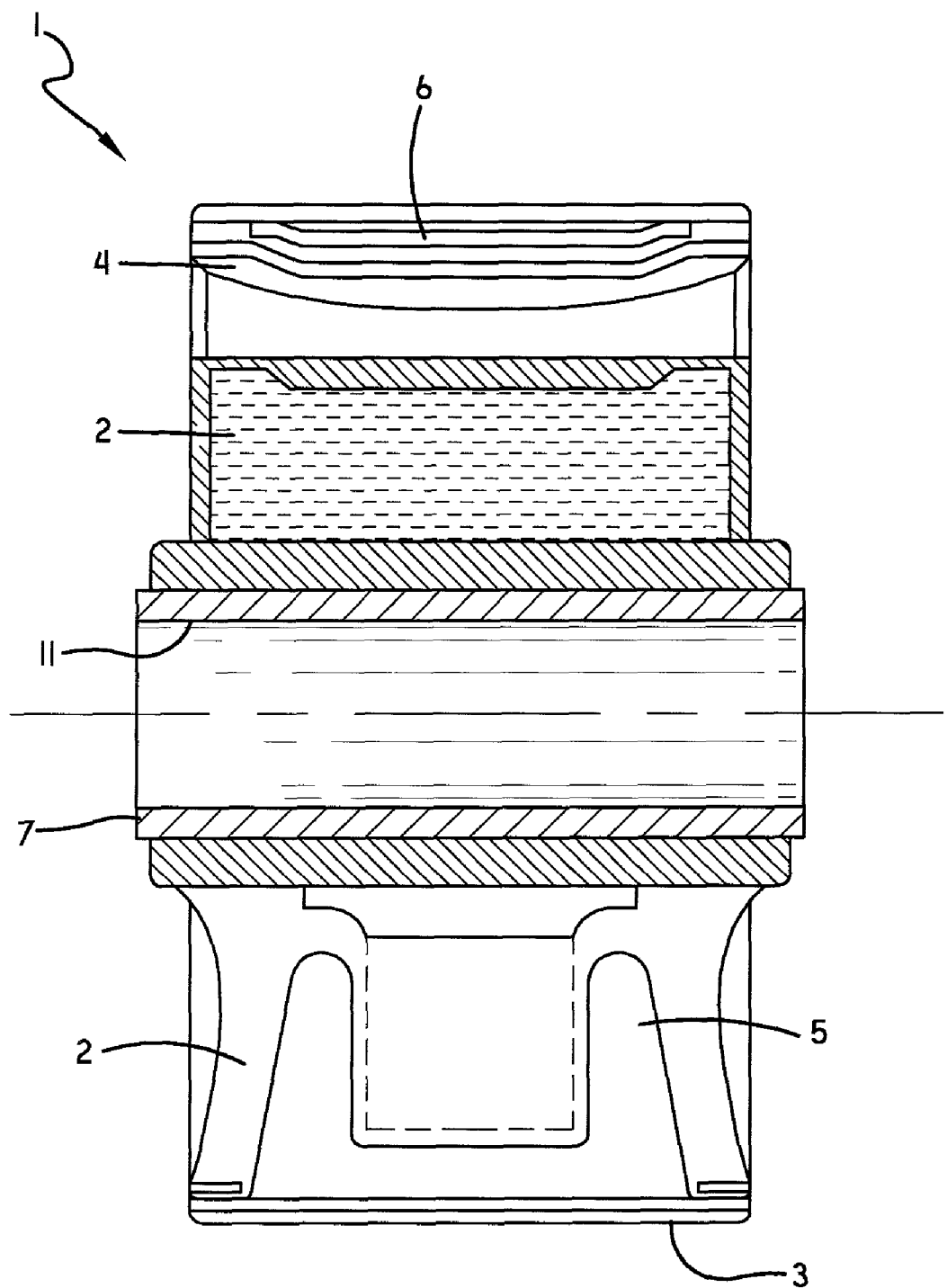
FIG. 5 is a sectional view of the hydraulic engine mount assembly shown in FIG. 4.

With continuing reference to FIG. 2, a first connection device 130 may be used to connect the hydraulic engine mount assembly 100 to the locomotion source 60 and can be of any type chosen with the sound judgment of a person of skill in the art. For the embodiment shown, the first connection device 130 comprises a collar member 131 that may be positioned at least partially within the support bracket 110. The collar member 131 may be substantially cylindrically shaped with an inner face 132 and an outer face 133. The elastomeric body 120 may be attached to the outer face 133 of the collar member 131 in any manner chosen with the sound judgment of a person of skill in the art such as, in one non-limiting embodiment, with an adhesive. In this way the elastomeric body 120 may be positioned at least partially between the outer face 133 of the collar member 131 and the inner face 111 of the support bracket 110. The first connection device 130 may be positioned at least partially within the collar member 131. This may be done, in one non-limiting example, in a manner similar to that described above with a shaft/bolt 8, a connection bracket 9, and bolts 12 (see FIGS. 4-5).

Still referring to FIG. 2, a second connection device 140 may be used to connect the hydraulic engine mount assembly 100 to the support structure 70 and can be of any type chosen with the sound judgment of a person of skill in the art. For the embodiment shown, the second connection device 140 comprises at least one connection bracket 141, two shown, attached to a third surface 116 on the outer face 112 of the support bracket 110. This attachment between connection device 140 and support bracket 110 can be of any type chosen with the sound judgment of a person of skill in the art such as a fixed attachment. Such a fixed attachment may be achieved, for one non-limiting example, by welding the connection bracket 141 to the support bracket 110. Alternatively, the connection bracket 141 could include a resin portion and a metal portion. The metal portion may be capable of receiving torque from a threaded connector to hold the connection bracket 141 to the support bracket 110. The connection bracket 110 may then be attached to the support structure, in one non-limiting example, in a manner similar to that described above with bolts 13 (see FIGS. 4-5).

Numerous embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Two or more passageways, for example, could be formed within the support bracket 110.

I claim:

1. A hydraulic engine mount assembly comprising:
   a support bracket comprising: first, second, and third surfaces; and, a first passageway with first and second spaced openings respectively communicating the first surface to the second surface;
   an elastomeric body attached to the support bracket including a first open portion extending between first and second circumferentially spaced edges that defines with the first surface of the support bracket a first fluid chamber and also including a second open portion extending between first and second circumferentially spaced edges that defines with the second surface of the support bracket a second fluid chamber, wherein the first edge of the first open portion is positioned between and the first edge of the second open portion and the second edge of the first portion about a circumference of the elastomeric body and wherein the first and second openings of the first passageway are respectively positioned directly adjacent to the first edge of the first open portion and the first edge of the second open portion;
   a fluid that is movable within the first passageway between the first and second fluid chambers to provide the hydraulic engine mount assembly with vibration damping characteristics;
   a first connection device for connecting the hydraulic engine mount assembly to a first connection surface; and,
   a second connection device for connecting the hydraulic engine mount assembly to a second connection surface, one of the first connection device and the second connection device being attached to the third surface of the support bracket.

2. The hydraulic engine mount assembly of claim 1 wherein the second connection device includes a first connection bracket attached to the third surface of the support bracket and a second connection bracket attached to the support bracket.

3. The hydraulic engine mount assembly of claim 2 wherein the first connection device includes a substantially cylindrically shaped collar member positioned at least partially within the support bracket wherein the elastomeric body is attached to an outer face of the collar member.

4. The hydraulic engine mount of claim 1 wherein a gap in the elastomeric body is positioned between the respective first edges of the first and second open portions about the circumference of the elastomeric body.

5. The hydraulic engine mount of claim 4 wherein the respective second edges of the first and second open portions are directly adjacent to one another about the circumference of the elastomeric body and the elastomeric body fills the circumferential distance between the respective second edges of the first and second open portions.

6. The hydraulic engine mount assembly of claim 1 wherein the support bracket is formed substantially of resin.

7. The hydraulic engine mount assembly of claim 1 wherein the elastomeric body is attached to the support bracket with an adhesive.

8. The hydraulic engine mount assembly of claim 1 wherein the support bracket is substantially cylindrically shaped with an inner face that defines the first and second surfaces, and an outer face that defines the third surface.

9. The hydraulic engine mount assembly of claim 1 wherein the fluid is a glycol.

10. The hydraulic engine mount of claim 1 wherein the first and second connection surfaces are respectively associated with an engine and a vehicle support structure.

11. The hydraulic engine mount of claim 1 wherein the respective second edges of the first and second open portions are closer to one another than the respective first edges of the first and second open portions about the circumference of the elastomeric body.

12. A method comprising the steps of:
   (A) forming a support bracket out of resin to have a first passageway with first and second spaced openings respectively communicating a first surface of the support bracket to a second surface of the support bracket;
   (B) attaching an elastomeric body to the support bracket including a first open portion extending between first and second circumferentially spaced edges to define with the first surface of the support bracket a first fluid chamber and also including a second open portion extending between first and second circumferentially spaced edges to define with the second surface of the support bracket a second fluid chamber, wherein the first edge of the first open portion is positioned between and the first edge of the second open portion and the second edge of the first portion about a circumference of the elastomeric body and wherein the first and second openings of the first passageway are respectively positioned directly adjacent to the first edge of the first open portion and the first edge of the second open portion; and,
   (C) adding a fluid into at least one of the first fluid chamber, the second fluid chamber and, the first passageway to provide a hydraulic engine mount assembly with vibration damping characteristics.

13. The method of claim 12 further comprising the step of: attaching a first connection device, that is suitable for connecting the engine mount assembly to one of an associated engine and an associated vehicle support structure, to the support bracket.

14. The method of claim 13 further comprising the step of: attaching a second connection device, that is suitable for connecting the engine mount assembly to the other of the associated engine and the associated vehicle support structure, to the engine mount assembly.

15. The method of claim 14 wherein the step of, attaching a second connection device to the engine mount assembly, comprises the step of:
   positioning a collar member at least partially within the support bracket.

16. The method of claim 12 wherein step (A) comprises the step of:
   molding the first passageway into the support bracket.

17. The method of claim 12 wherein step (B) comprises the step of:
  attaching the elastomeric body to the support bracket with an adhesive.

18. The method of claim 12 wherein step (A) comprises the step of:
  forming the support bracket to be substantially cylindrically shaped with an inner face that defines the first and second surfaces.

19. A hydraulic engine mount assembly comprising:
  a support bracket that: (1) is substantially cylindrically shaped with an inner face having first and second surfaces and an outer face; (2) is formed substantially of resin; and, (3) has a first passageway with first and second spaced openings respectively communicating the first surface of the inner face to the second surface of the inner face;
  a collar member that: (1) is substantially cylindrically shaped with an inner face and an outer face; and, (2) is positioned at least partially within the support bracket;
  an elastomeric body that: (1) is attached to the inner face of the support bracket with an adhesive; (2) includes a first open portion extending between first and second circumferentially spaced edges that defines with the first surface of the inner face of the support bracket a first fluid chamber; (3) includes a second open portion extending between first and second circumferentially spaced edges that defines with the second surface of the inner face of the support bracket a second fluid chamber; and, (4) is positioned at least partially between the outer face of the collar member and the inner face of the support bracket, wherein the first edge of the first open portion is positioned between and the first edge of the second open portion and the second edge of the first portion about a circumference of the elastomeric body and wherein the first and second openings of the first passageway are respectively positioned directly adjacent to the first edge of the first open portion and the first edge of the second open portion;
  a fluid that: (1) is received within the first and second fluid chambers; and, (2) is movable within the first passageway between the first and second fluid chambers to provide the hydraulic engine mount assembly with vibration damping characteristics;
  a first connection device that: (1) connects the engine mount assembly to an associated engine; and, (2) is positioned at least partially within the collar member; and,
  a second connection device that: (1) connects the engine mount assembly to an associated vehicle support structure; and, (2) is fixedly attached to the outer face of the support bracket.

20. The hydraulic engine mount assembly of claim 19 wherein the fluid is a glycol.

* * * * *